July 2, 1957 J. H. WIENS 2,798,115

STEREOSCOPIC RECONNAISSANCE SYSTEM

Filed Oct. 28, 1952 3 Sheets-Sheet 1

JACOB H. WIENS,
INVENTOR.

BY

ATTORNEY.

July 2, 1957 J. H. WIENS 2,798,115

STEREOSCOPIC RECONNAISSANCE SYSTEM

Filed Oct. 28, 1952

3 Sheets-Sheet 2

JACOB H. WIENS,
INVENTOR.

BY Reed C. Lawlor

ATTORNEY.

STEREOSCOPIC RECONNAISSANCE SYSTEM

JACOB H. WIENS,
INVENTOR.

BY Reed C. Lawlor
ATTORNEY.

2,798,115
Patented July 2, 1957

2,798,115

STEREOSCOPIC RECONNAISSANCE SYSTEM

Jacob H. Wiens, Redwood City, Calif., assignor of thirty percent to Reed C. Lawlor, Alhambra, Calif.

Application October 28, 1952, Serial No. 317,217

16 Claims. (Cl. 178—6.5)

My invention relates to surveying systems, and more particularly to systems for stereoscopic surveying of terrain from the air by employing television techniques. While my invention has application to other types of stereoscopic television systems, it is described below primarily with reference to aerial surveying.

In my prior patent application Serial No. 189,614, filed by me October 11, 1950, I have described and claimed a system for surveying terrain over which an aircraft is flying by scanning successive lineal segments of the earth over which the aircraft flies, successively modulating a radio frequency wave in accordance with the picture signals produced in the scanning process, and transmitting this modulated wave to a remote point where it is demodulated and the picture signals are integrated to produce a picture of the terrain. In the form of the present invention, described hereinbelow, many features of the system of that prior application are employed, and while the system of that former application is particularly adapted for use in the present invention and while the present invention employs many features of that prior application, it will be understood that the present invention is not limited to the features of the aforementioned copending application, but that it may be employed with other forms of apparatus utilizing the principles of the present invention within the scope of the appended claims.

According to this invention, an image of the object field is formed in an image area, and portions of the image appearing along two fixed mutually spaced lines of the image area are alternately scanned as the image moves across the area in a direction transverse to those lines. As the portions of the image along the fixed lines are scanned, the radiation received from different points of the terrain is detected, and converted into electrical picture waves. In this manner, two series of picture waves are produced, one series corresponding to the segments of the image scanned along one of the fixed lines, and the other series corresponding to the segments of the image appearing along the other fixed line. The two series are interlocked without overlapping of the picture waves themselves, forming a composite picture wave which is then employed to modulate the radio frequency wave emitted from the transmitter.

The modulated wave emitted by the transmitter is received at a remote point and is there employed in the reconstruction of the pair of stereoscopic images of the area surveyed. At the receiving point the composite picture wave is segregated into the two series of picture waves. Each of these series of picture waves is then integrated by a separate image reproducer, such as a facsimile recorder, in order to produce the two desired stereoscopic images.

The progression of the image across the image area may be effected in several different ways without departing from the principles of this invention. When my double-line scanning system is applied to aerial reconnaissance surveying, the associated viewing system may be mounted directly upon the aircraft with its optical axis pointed downwardly. In this case, the scanning system may be arranged with the two scanning lines transverse to the longitudinal axis of the aircraft, or transverse to he direction of flight, as may be desired. Then as the aircraft flies over the area, successive segments of the area are scanned along each line and corresponding electrical picture waves are produced. When my invention is applied to simple searching from the air, the optic axis of the viewing system is directed toward the area under observation and carried with the airplane in a direction transverse to the scanning lines so as to cause an image of the area being observed to cross the image area in a direction transverse to the scanning lines. In any event, one of the scanning lines is located in the image area in advance of the other, so that, in effect, the picture waves produced by scanning one of the lines corresponds to a view of the aircraft that would be obtained in viewing the terrain in one direction and the other series of picture waves corresponds to the view that would be obtained in viewing the same terrain in a slightly different direction. Thus, each segment of the terrain is scanned twice, once as viewed forwardly and once as viewed rearward. Accordingly, the two pictures reproduced at the receiver may be examined in order to determine the relative elevation of various portions of the terrain, and also to detect motion of objects on the terrain.

An object of my invention is to provide an improved stereoscopic surveying system employing television techniques.

Another object of my invention is to provide a stereoscopic system that employs only a single television camera that is moved between the scanning of two views of a given segment of an object field.

Another object of my invention is to provide a stereoscopic surveying system employing television techniques in which picture waves representing segments of different stereoscopic views alternately modulate successive portions of a radio frequency carrier wave.

Another object of my invention is to provide a stereoscopic surveying system employing television in which a radio frequency wave is alternately modulated in accordance with different stereoscopic views, with a receiver in which the picture waves corresponding to the different views are segregated and separately integrated to produce a pair of stereoscopic views of the object field.

My invention possesses numerous objects and features of advantage, some of which, together with the foregoing, will be set forth in the following description of specific apparatus embodying and utilizing my novel method. It is, therefore, to be understood that my method is applicable to other apparatus and that I do not limit myself in any way to the apparatus of the present specification, as I may adopt various other apparatus embodiments utilizing the principles of my invention within the scope of the appended claims.

Figure 1:
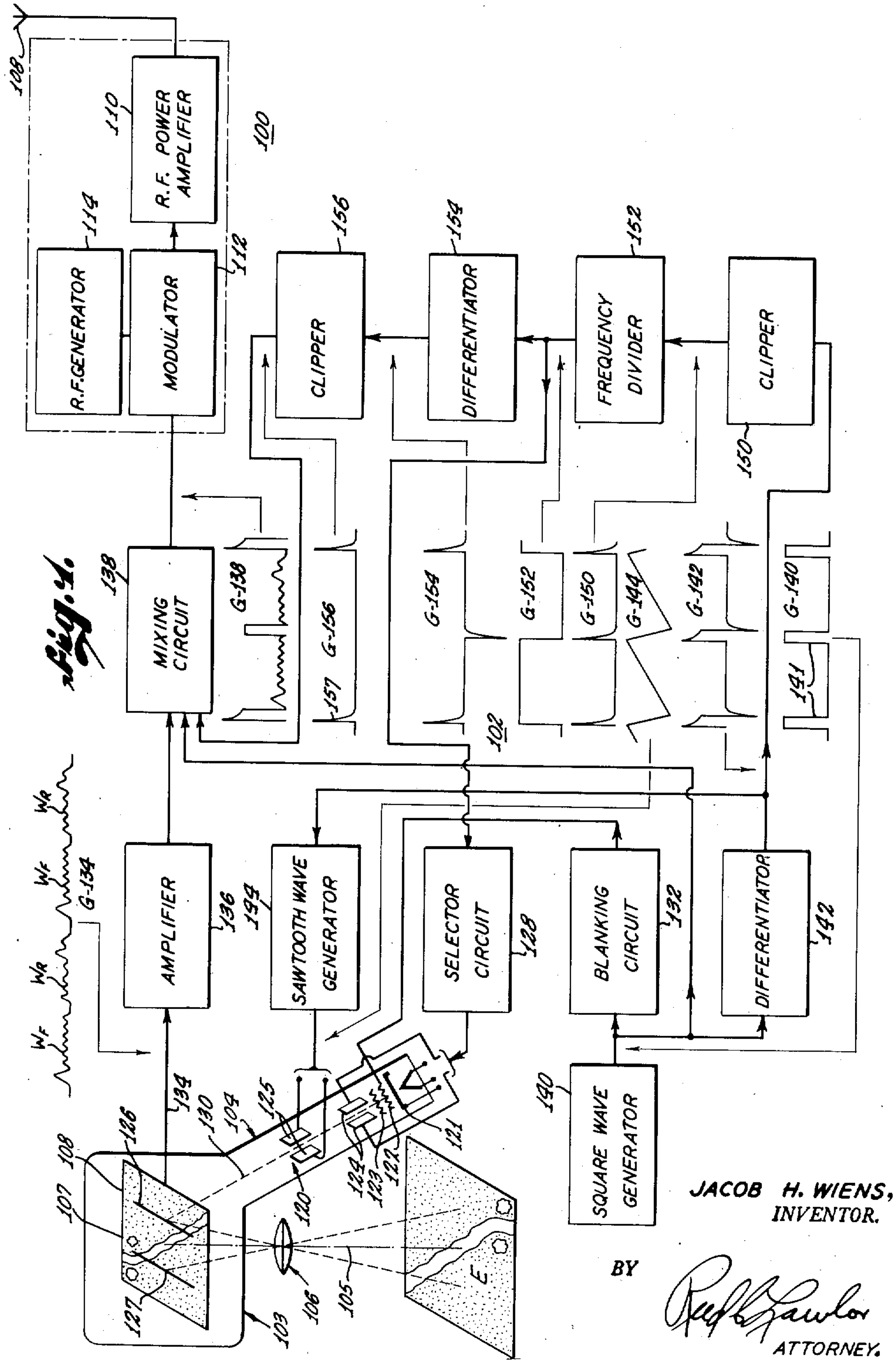
Figure 1 is a schematic diagram of a transmitter employed in my invention.
Figure 3:
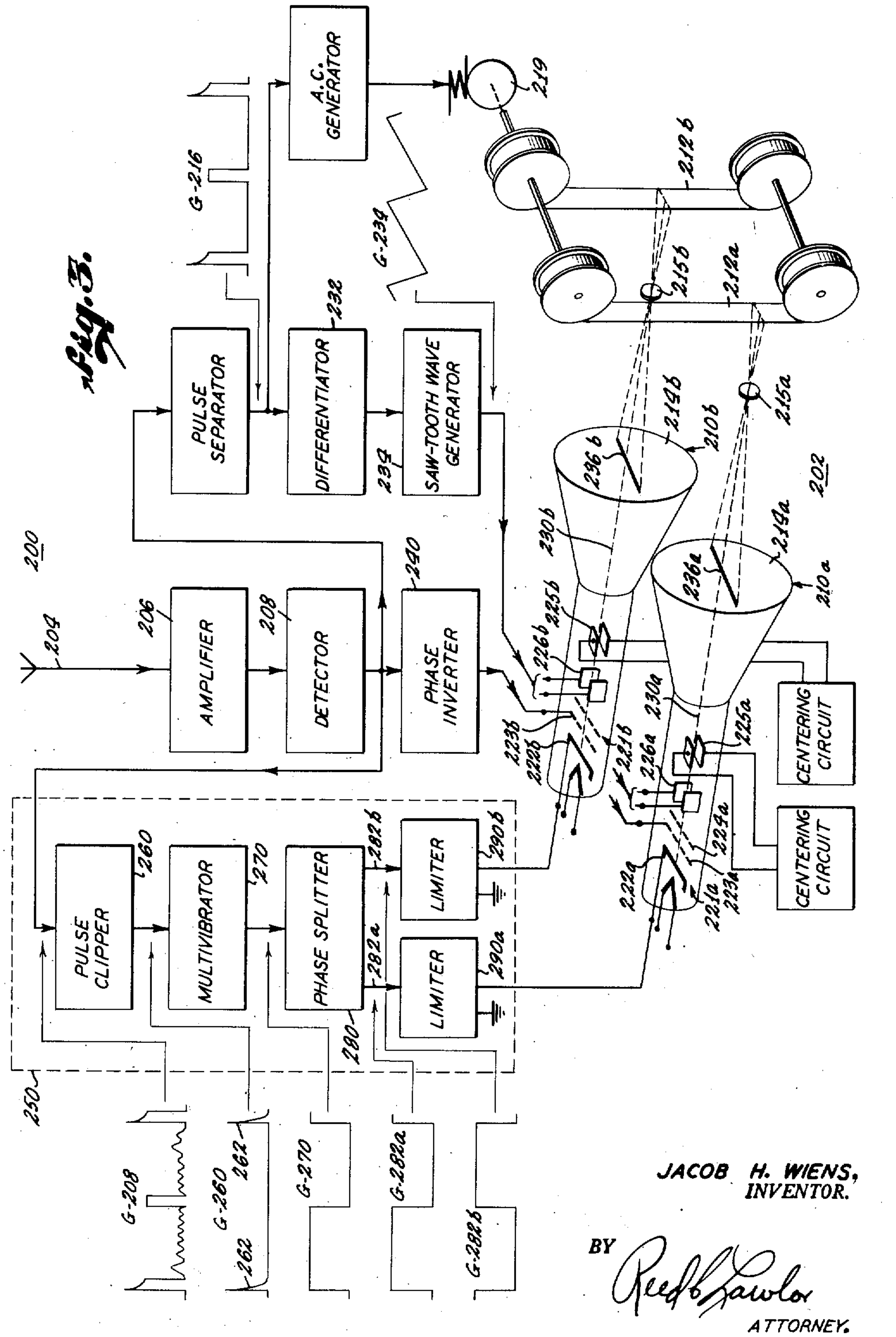
Fig. 3 is a schematic diagram of a receiver employed in my invention.

In the stereoscopic surveying system for use with aircraft, illustrated in Figs. 1 and 3, a transmitter 100 is mounted upon the aircraft and a receiver 200 is located at a home, or base, station on the ground. A scanning system 102 employed for modulating the radio frequency carrier wave emitted by the transmitter 100 is also mounted upon the aircraft. An image reproducer 202 in the form of a stereoscopic facsimile recorder is also mounted at the base station and is operated by the receiver 200 in synchronism with the scanning of the area surveyed at the transmitter.

I. *Description of transmitting system*

The scanning system 102 of the transmitter 100 comprises an imaging system 103, such as an iconoscope, or other camera tube, and an optical system 106, together with associated electrical equipment for modulating the output of the transmitter 100 in accordance with two series of electrical picture waves, each corresponding to a different view of the terrain. The transmitter 100 comprises an antenna 108 which is fed by a radio frequency power amplifier 110 which amplifies the output of a modulator 112 in which a carrier wave of radio frequency generated by a radio frequency generator 114 is modulated by the picture waves supplied from the scanning system 102.

The imaging system 103 is mounted on the aircraft with its optic axis 105 vertical so that an image of the terrain over which the aircraft is flying is focused upon an image area 107 of a mosaic, or other light-sensitive, screen 108 of the iconoscope 104. The iconoscope 104 includes an electrode system 120 including a cathode 121, a control grid 122, a focusing electrode 123, a pair of selector plates 124, and a pair of scanning plates 125, all arranged in sequence along the axis of a stem 126 at one side thereof. The two pairs of plates 124 and 125 are arranged to produce electric deflection forces at right angles to each other.

An electron beam 130 accelerated in conventional manner is projected from the cathode 121 past the control grid 122 and electrode 123 and between the opposite members of the pairs of plates 124 and 125 to the mosaic screen 108. According to this invention, a squarewave voltage is applied to the selector circuit 128 and then impressed upon the selector plates 124 while a periodic sawtooth-wave voltage is applied to the scanning plates 125. The frequency of the square-wave voltage is equal to the scanning frequency and is one-half that of the sawtooth-wave voltage, this frequency sometimes being referred to hereinafter as half-frequency. The square wave voltage from the selector circuit 128 causes the electron beam to fall upon scanning lines 126 and 127 in alternate half cycles of the square wave voltage.

Figure 2:
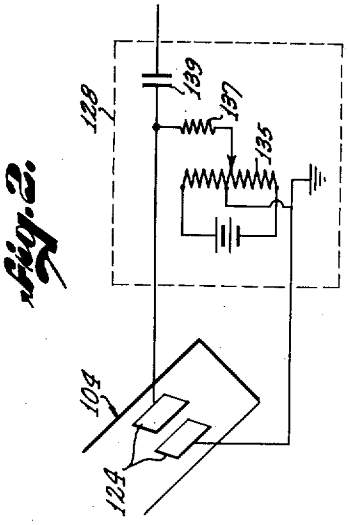
Fig. 2 is a wiring diagram of a selector circuit employed to alternate the scanning.

In Fig. 2 I have illustrated schematically a simple form of selector circuit 128 which may be employed in the transmitter of Fig. 1. This selector circuit 128 employs a center tapped potentiometer 135. The center tap is grounded and is connected to one of the deflector plates 124. The slide wire is connected through a resistor 137 to the other plate 124. The square-wave voltages represented by graph G152 are also applied to this other deflecting plate 124 through a coupling condenser 139. The time constant of the circuit formed by this condenser 139, the resistor 137 and the potentiometer 135 is somewhat longer than the period of the square waves in order that the deflection force applied to the electron beam by the plates 124, 124 during each half-cycle shall be substantially constant. It is to be understood, however, that if this force varies slightly this is not especially detrimental so long as the electron beam always scans images of the terrain along lines 126 and 127 that are fixed in the image area.

The two scanning lines 126 and 127 are mutually spaced apart in parallel relationship, both being at right angles to the longitudinal axis of the aircraft upon which the scanning system 102 is mounted, or otherwise transverse to the course of flight. The distance between the lines depends on the amplitude of the square-wave voltage applied to the selector plates 124, 124.

The optical system 106 focuses upon the image area 107 an image of the terrain E. As the aircraft flies over the terrain, images of successive lineal segments of the earth appear seriatim along each of the scanning lines 126 and 127. As the aircraft flies over the terrain, each lineal segment of the terrain first appears along scanning line 126 and then later along scanning line 127. Thus, the images appearing along scanning line 126 correspond to a forward-view of the terrain, while those appearing along scanning line 127 correspond to a rearward-view of the terrain, these views being from entirely different directions along the flight course. These views are somewhat like those that might be seen at high altitude from two points widely spaced apart in the air.

As the electron beam 130 scans the scanning line 126, an electrical picture wave appears at the output electrode 134. Then as the electron beam scans the image appearing along scanning line 127, another electrical picture wave appears at the output electrode 134. As the scanning lines 126 and 127 are alternately scanned by the electron beam 130, two alternating series of picture waves are produced as illustrated in graph G134. Here it will be noted that the series of picture waves $W_F$ corresponding to the forward view alternates with the series of picture waves $W_R$ corresponding to the rearward view, and none of the picture waves overlap.

The period of scanning is the period of the square-wave voltage supplied by the selector circuit 128. This period is the time interval elapsed between successive instants when the electron beam 130 falls on any particular point of either scanning line 126 or 127. The interval during which each of the respective lines 126 and 127 is scanned is about one-half of the scanning period, although it could be somewhat less without loss of many of the advantages of this invention. For example, so long as a small number of scanning lines are employed, the scanning interval is a substantial fraction of the scanning period, and the advantages of this invention are still attained.

The composite picture wave consisting of the two series of picture waves appearing at the output electrode 134, is amplified by an amplifier 136, and the amplified composite picture wave is impressed upon a mixing circuit 138 where it is combined with square waves and with registration pulses, as explained more fully hereinbelow. The combined output from the mixing circuit 138 is then impressed upon the modulator 112 to modulate the carrier wave generated by the generator 114.

The scanning system 102 employs a square-wave generator 140 to produce control pulses that control the generation of the sawtooth-wave scanning voltages and the generation of registration pulses. The square-wave generator 140 may be of any suitable type for periodically generating control pulses in the form of square waves 141 of short duration, as indicated in the graph G140. In this graph, as in all others of Figs. 1 and 2, ordinates represent voltages and abscissae represent time, positive changes of voltage being usually upward and negative changes being usually downward but time invariably progressing from left to right. For convenience in coordinating the graphs of Fig. 1 and Fig. 2, they are all drawn to the same time-scale.

The output of the square-wave generator 140 passes through a differentiating circuit 142 to produce a voltage wave of the shape indicated in graph G142 having sharp peaks when each square wave 141 begins and ends. This voltage wave G142 is employed to excite a sawtooth-wave generator 144 which is designed to produce an asymmetrical sawtooth-wave voltage, as indicated in graph G144. Here it will be noted that the output of the sawtooth-wave generator 144 comprises a periodic voltage wave which changes relatively slowly in a positive direction while the output of the square-wave generator 140 is zero, and a portion which changes relatively rapidly in a negative direction while the output of the square-wave generator 140 is positive.

The output of the sawtooth-wave generator 144 is applied directly to the scanning plates 125, causing the electron beam 130 to move forwardly in one direction along a scanning line while the sawtooth-wave scanning voltage is increasing relatively slowly and to return in the opposite direction while the scanning voltage is decreasing relatively rapidly. The output of the square-wave generator 140 is applied through a phase inverting blanking circuit 132 to the control grid 122. Thus, the control grid 122 serves to permit an electron beam 130 of fixed intensity to strike the screen 108 while the sawtooth-wave voltage is increasing, thereby moving the beam in one direction and to cut off or suppress the electron beam 130 while the sawtooth-wave voltage is decreasing, thereby moving the beam in the opposite direction.

The voltage wave G142 appearing at the output of the differentiating circuit 142 is also passed through a clipping circuit 150 which produces at its output positive pulses corresponding to the positive portions of voltage wave G142. The positive pulses produced at the output of the clipper 150 are indicated by graph G150. These pulses are impressed upon a scale-of-two frequency divider 152 which produces at its output a square wave of half-frequency, as indicated by graph G152. The period of this wave is the scanning period. The voltage wave appearing at the output of the frequency divider 152 is applied through the selector circuit 128 to the selector plates 123, 123 to direct the electron beam 130 at one of the scanning lines 126 or 127 or the other. Due to the action of the sawtooth-wave G144 appearing at the output of the sawtooth-wave generator 144, while the scanning voltage produced by the sawtooth wave 144 is increasing, the electron beam 130 sweeps along scanning line 126 during half of the cycle of the square wave G152 and along the scanning line 127 during the other half of the cycle of the voltage wave G152. But while the sawtooth wave G144 is decreasing, the electron beam is shut off and during this interval the beam is switched from one line 126 or 127 to the other.

As a result of the scanning operation and the suppression of the electron beam 130 during the intervening intervals, the two series of picture waves are generated on the forward sweeps, one series $W_F$ corresponding to the forward view of the terrain as it appears on scanning lines 126 and the other series $W_R$ corresponding to the rearward view of the terrain as it appears on the scanning line 127. The scanning interval of each wave is slightly less than one-half the scanning period. But nevertheless, full advantage is taken of the resolving power of the iconoscope along the scanning lines so that a high number, in fact hundreds, of changes of radiation level along each scanning line may be detected. The individual picture waves of the two series are interlocked, both appearing at the input of the amplifier 136 and successive picture waves of the two interlocked series are separated by blanks, or gaps, of the same duration as the square waves 141.

The output of the frequency divider 152 is passed through a differentiating circuit 154, thus producing a series of positive and negative pulses indicated by the graph G154. These pulses are passed through a clipping circuit 156, thereby generating a series at positive registration pulses 157 of half-frequency, indicated by the graph G156. The period between successive pulses is the same as the scanning period.

As the two series of electrical picture signals are generated in the iconoscope 104, the control pulses 141 from the square-wave generator 140, the registration pulses of half-frequency appearing at the output of the clipping circuit 156, as well as the picture signals, are impressed upon the mixing circuit 138 so as to produce a composite signal wave represented in the graph G138. In this graph, forward and rearward picture signals $W_F$ and $W_R$ respectively alternate periodically at regular intervals, both picture waves appearing regularly but alternately at half-frequency. Between successive picture signals there appear square waves $W_{141}$, and upon alternate square waves at the front ends thereof registration pulses $W_{157}$ are impressed.

In order to facilitate synchronization at the receiver, the amplitude of the square-wave pulses is preferably greater than the amplitude of any of the intervening picture signals. With this arrangement, if amplitude modulation is employed, the radio wave emitted by the antenna 108 comprises a carrier wave modulated with an envelope having the shape of the composite signal wave G138. If a frequency modulated transmitter is employed the frequency of the radio wave emitted is modulated in a corresponding manner. In either event, the modulated radio frequency wave is emitted from the antenna 109.

II. *Description of recording system*

The modulated wave arriving at the receiver 200 is picked up by a receiving antenna 204 and amplified in a suitable radio-frequency amplifier 206, and the amplified wave is demodulated by means of a detector 208 in order to reconstruct the composite signal wave G138, as indicated at the output of the detector by the graph G208, this graph being the same as graph G138. The output of the detector 208 is applied to a stereoscopic facsimile recorder 202 or other stereoscopic image reproducer in order to construct two stereoscopic images of the terrain over which the aircraft is flying. The stereoscopic facsimile recorder 202 employs a pair of cathode ray tubes 210*a* and 210*b* operated in synchronism with the scanning system 102 to reproduce the line images scanned in the iconoscope tube 104.

The two cathode ray tubes 210*a* and 210*b* comprise corresponding electrode systems 221*a* and 221*b*, each including a cathode 222*a* or 222*b*, a control grid 223*a* or 223*b*, a focusing electrode 224*a* or 224*b*, a pair of centering plates 225*a* or 225*b*, and a pair of scanning plates 226*a* or 226*b*. The two pairs of plates 224*a* or 224*b* and 225*a* or 225*b* respectively of each tube are arranged at right angles to each other. Electron beams 230*a* and 230*b* are accelerated in the conventional manner toward the cathode ray screen 214*a* and 214*b* respectively where they cause the screens to become illuminated at the points of impingement in accordance with the intensities of the corresponding electron beams 230*a* and 230*b*.

According to this invention, the two series of picture waves corresponding to the forward view and the rearward view respectively are segregated at the receiver and recorded as separate pictures of the terrain on two films 212*a* and 212*b* onto which reproductions of the respective line images are projected from the cathode ray tubes 210*a* and 210*b* in the stereoscopic facsimile recorder 202. In particular, the successive images of the forward view scanned on the line 126 of the iconoscope tube 104 are reproduced as images along a reproducing line 236*a* on the screen 214*a* of the cathode ray tube 210*a*. Similarly, the successive images of the rearward view scanned on the line 127 of the iconoscope tube 104 are reproduced as an image along a reproducing line 236*b* on the screen 214*b* of the cathode ray tube 210*b*. The two received images formed on the lines 236*a* and 236*b* are then focused by means of corresponding lenses 215*a* and 215*b* upon two corresponding films 212*a* and 212*b* that are moved in synchronism by a common motor 219 at the same speed along their lengths past the focal planes of the lenses. Successive segments of the image field corresponding to the forward view are reproduced seriatim on one film 212*a* and those corresponding to the rearward view are likewise reproduced on the other film 212*b*. Thus, two separate integrated stereoscopic views of the terrain are produced on the films 212_a_ and 212_b_. The manner in which the electric picture waves are segregated and reproduced on the two cathode ray tubes 210_a_ and 210_b_ is explained more fully below.

The output of the detector 208, including both series of electrical picture waves, is amplified and inverted by means of a phase-inverting amplifier 240 and is then impressed upon the two control grids 223_a_ and 223_b_ of the corresponding cathode ray tubes 210_a_ and 210_b_. An adjustable bias voltage supplied by the phase inverter 240 causes the two electron beams 230_a_ and 230_b_ to be cut off or suppressed, while the square-wave portions of the amplified signals represented by the graph G240 are applied to the control grids 223_a_ and 223_b_. Thus, both electron beams 230_a_ and 230_b_ are cut off during the intervals when electrical picture waves are not being impressed upon the control grids 223_a_ and 223_b_.

The output of the detector 208 is also impressed upon a pulse separator 216 which suppresses the picture signals and reproduces only the intervening pulses at its output, as indicated in graph G216. This output wave is impressed upon a differentiator 234 which therefore produces at its output a sawtooth wave voltage indicated by the graph G234. The sawtooth wave represented by the graph G234 is the same shape as the sawtooth wave G144 produced in the scanning system 102. The sawtooth-wave voltage represented by graph G234 is applied to the scanning plates 226_a_ and 226_b_ of the two cathode ray tubes 210_a_ and 210_b_ to cause the electron beams 230_a_ and 230_b_ to sweep relatively slowly in one direction along the reproduction lines 236_a_ and 236_b_ as the sawtooth-wave voltage is increasing relatively slowly and to sweep rapidly in the return direction along those lines as the sawtooth-wave voltage is decreasing relatively rapidly. The sawtooth-wave voltage represented by graph G234 is synchronized with the composite wave impressed upon the control grids 223_a_ and 223_b_ so that the relatively low scanning occurs in one direction while picture waves are impressed upon these grids and the rapid return sweep occurs while the control grids are biased to cut off by the square waves.

Individual centering circuits 231_a_ and 231_b_ are connected respectively to the centering plates 225_a_ and 225_b_ in order to adjust the positions of the reproduction lines 236_a_ and 236_b_ along which the picture waves reproduce line images of the terrain.

An image segregator 250 is employed to periodically bias the cathode ray tube 210_a_ to reproduce only forwardly viewed images and the cathode ray tube 210_b_ to reproduce only rearwardly viewed images. The image segregator 250 comprises a pulse clipper 260 connected to the output of the detector 240. This pulse clipper is biased to reproduce at its output pulses 262 corresponding to the registration pulses 157 of the incoming signals, as indicated by the graph G260. These pulses excite a free-running multivibrator 270 which generates at its output a square wave of scanning frequency, as indicated by the graph G270. This square wave is passed through a phase splitter 280, thereby producing at two separate outputs 282_a_ and 282_b_ two separate square waves, indicated by the graphs G282_a_ and G282_b_, which are oppositely phased. One of the square waves is applied to a first limiter 290_a_ and thence to a cathode 222_a_ and the other to a second limiter 290_b_ and thence to the other cathode 222_b_. The two square waves impressed upon the cathodes cause the electron beams 230_a_ and 230_b_ in the respective tubes to be cut off alternately. With this arrangement only one series of electrical picture waves $W_F$ corresponding to the forward view is reproduced on one screen 214_a_ and only the other series of electrical picture waves $W_R$ corresponding to the rearward view is reproduced on the other screen 214_b_.

Figure 4:
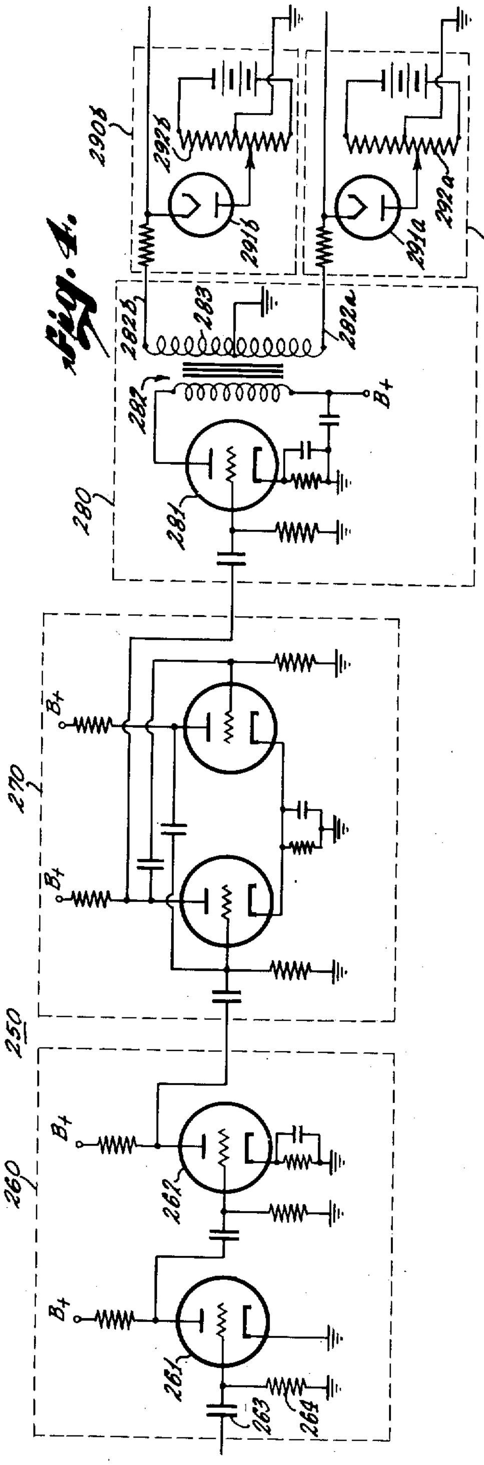
Fig. 4 is a wiring diagram of a segregating circuit employed in the receiver.

In Fig. 4, there are illustrated schematically diagrams of circuits that may be employed in an image segregator

250. Here it will be noted that the pulse clipper 260 comprises a clipper stage 261 and an inverter stage 262. The time constant of the circuit formed by the condenser 263 and the resistor 264 in the grid circuit of the clipper stage 261 is long, being of the order of the scanning period. Consequently, as the square waves are impressed upon the input of the clipper stage, this stage remains biased to such an extent as to prevent picture signals from appearing in the output. However, the registration pulses 262 appear in the output of the clipper stage. These pulses are phase-inverted by the inverter stage 262, thereby producing pulses indicated by the graph G260 of Fig. 1.

The registration pulses are employed to periodically trigger a multivibrator 270 of conventional design. The natural period of this multivibrator 270 is slightly longer than the scanning period. When the registration pulses are impressed upon its input, they lock it in step with the registration pulses, thereby producing at the output of the multivibrator a square wave of half-frequency. The period of a half-cycle of this wave may be sufficiently long to extend slightly into the next half-cycle of the scanning process. However, as long as it does not extend beyond the end of the next blanking pulse satisfactory operation is obtained.

The resultant square wave represented by the graph G270 is then supplied to a phase-splitter 280 so that two square waves of opposite phase or polarity are produced at separate outputs 282_a_ and 282_b_ of the phase-splitter. The phase-splitter 280 employs a class A amplifier stage 281 having a transformer 282 in its output. The secondary winding 283 of the transformer 282 is grounded and the opposite terminals are connected to the respective outputs 282_a_ and 282_b_.

The two square waves represented by the graphs G282_a_ and G282_b_ appearing at the respective outputs of the phase-splitter are applied to limiters 290_a_ and 290_b_. Each of the limiters includes a corresponding rectifier 291_a_ and 291_b_ which permits the cathode 222_a_ and 222_b_ of the corresponding cathode ray tubes 210_a_ and 210_b_ to be driven in a positive direction but not in a negative direction. The limiters also include potentiometers 292_a_ and 292_b_ for setting the bias voltages on the cathodes 222_a_ and 222_b_ of the respective cathode ray tubes. The cathodes 222_a_ and 222_b_ are so biased that during the positive half-cycle of each of the voltage waves represented by graphs G282_a_ and G282_b_ appearing at the output of the phase-splitter, the corresponding cathode ray oscilloscope is biased to cut off, but during the other half-cycle a picture wave is reproduced as a variable brightness image on the screen of the corresponding cathode ray tube. Accordingly, only alternate picture waves produce images on either one of the cathode ray oscilloscopes, and the other alternate picture waves produce images on the other cathode ray oscilloscope. Thus, each of the series of picture waves produced in scanning the two lines 126 and 127 produces images on separate records 112_a_ and 112_b_.

The output of the pulse separator 216 is also impressed upon an alternating current generator 218 to cause the generator to produce a sinusoidal output voltage of the same frequency as the square wave represented by graph G216. The power supplied from the A. C. generator is employed to operate the synchronous motor 219 in order to advance the films 212_a_ and 212_b_ along their lengths at the same constant speed in synchronism with the reproduction of segmental images of the terrain on the screens 214_a_ and 214_b_. These images of each series are thus recorded side by side on the respective records 212_a_ and 212_b_, thus integrating the picture segments and producing two stereoscopic strip photographs of the terrain.

III. *Interpretation of records*

Figure 5:
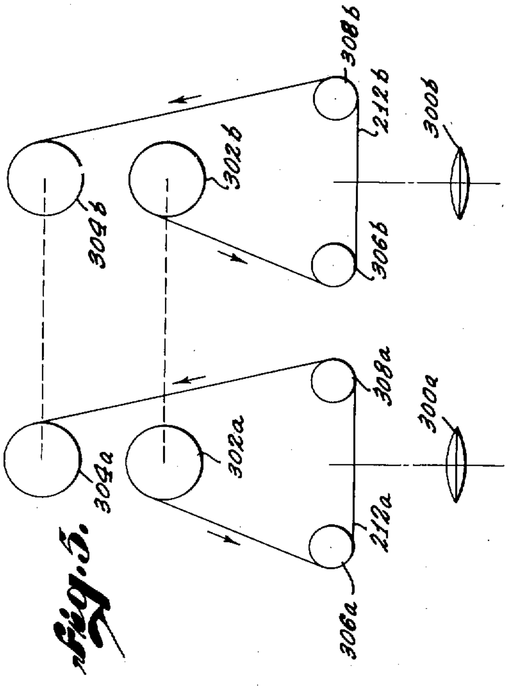
Fig. 5 is a schematic diagram of a steroscope employed with my invention.

The films 212_a_ and 212_b_ upon which the forward view and the rearward view of the terrain are reproduced, as above described, are then developed. These views are then examined by the observer by means of a stereoscope such as that illustrated in Fig. 5. In this stereoscope, the two records 212a and 212b are separately viewed by means of corresponding lenses 300a and 300b, one record being viewed only with the right eye, and the other record being viewed only with the left eye. With this arrangement, a binocular view of the terrain is obtained corresponding somewhat to that which would be seen by an observer on the airplane having eyes spaced apart the distance that the airplane travels in half the scanning period, that is the interval required for an image of the earth to move from the beginning of scanning line 126 to the beginning of scanning line 127. The result is that an exaggerated three dimensional image of the earth is seen by the observer, thus permitting him to determine readily the relative heights or elevations of parts of objects in the terrain. The records of the two views may be mounted on front intercoupled spools 302a and 302b and rear intercoupled spools 304a and 304b respectively and the two films moved in synchronism on pulleys 306a, 308a and 306b, 308b in front of the lenses by turning one of the spools.

If an object on the ground has moved, either along the course of flight or transverse to the course of flight, between the time that images thereof appear on the two scanning lines 126 and 127, this fact may be made evident either by viewing the two records 212a and 212b stereoscopically or by means of a flicker technique in which the two views are alternately made visible in the field of view. For example, if an object on the ground has moved along the course of flight during the time that it appears on the scanning lines 126 and 127 then it will be displaced differently relative to other objects on the terrain in the two records 212a and 212b. For this reason, when viewed stereoscopically, the object in question will appear to be located above or below the surrounding terrain depending upon its direction of travel. An estimate of the apparent displacement of the object above or below the terrain, or the difference in displacements in the views, may be employed to calculate the speed of the object. In such a calculation, account is taken of the elevation of the aircraft above the terrain, the length of the scanning period, the speed of the airplane, and the geometry of the viewing system 103.

Thus, to consider one specific example, suppose that the angle formed between the forward view and the rearward view is 5°, as determined by the relative location of the two scanning lines 126 and 127 relative to the axis of the optical system 106. In this case, if the aircraft is flying at 200 M. P. H. at an elevation of 5,000 feet, the distance between simultaneous forward and backward scanning positions on the terrain is 435 feet and the distance traveled by the airplane in one second is 290 feet. It is determined from an examination of the two photographs that a truck has moved a distance of 46 feet along the course of flight between the time that it is scanned on the two lines 126 and 127. In this case, the speed of the truck is given by the following formula $$\frac{S}{290}=\frac{46}{435}$$

that is $S=20$ feet per second.

IV. *Conclusion*

From the foregoing description of my invention, it is apparent that I have provided an improved method of stereoscopic aerial surveying. This system by employing television surveying principles of the type disclosed in my aforesaid copending patent application makes it possible to obtain a stereoscopic aerial survey at a home base without delay and by employing only a relatively narrow band of frequency to transmit the desired information.

My invention has been described herein with reference to only a dual line scanning system. However, it will be understood that other multiple line scanning systems may be employed and that the various views detected on the various scanning lines may be segregated and separately integrated by corresponding recorders at the receiver. In any event, if only a few scanning lines are employed, the scanning interval of each line is a substantial fraction of the scanning period and in this case the advantages of narrow band television transmission may be obtained, as explained in my aforementioned copending application.

In the drawings my invention has been illustrated schematically only in sufficient detail to enable those skilled in the art of television, radar, and kindred arts to practice my invention. For this reason, various circuit of elements which are normally incorporated in individual circuits of the type described to achieve the results desired have in many instances not been described in detail, since such details may be readily supplied by those skilled in the art. Also, for this reason, where individual circuits have been illustrated, the values of various circuit elements have not been specifically mentioned, since the selection of appropriate values is well within the ability of those skilled in the art who may desire to practice my invention. It will also be understood that the circuits and the various arrangements illustrated and described may be altered and connected in many ways by those skilled in the art without departing from the principles of my invention. It is therefore to be understood that my invention is not limited to the details of the specific circuits and arrangements illustrated and described but that my invention encompasses all modifications thereof which fall within the scope of the appended claims.

I claim:

1. In a stereoscopic aerial survey system in which terrain is surveyed from an aircraft in flight along a flight course over said terrain: means defining an image area on said aircraft; two sets of photo-sensitive parts respectively arranged on two spaced-apart scanning lines in said image area for receiving radiation projected onto said image area; means for projecting onto said image area an aerial image of the terrain relative to which the aircraft is flying whereby the images of successive lineal segments of said terrain that lie transverse to the flight course progress along a reference axis extending in a predetermined direction in said image area and past said scanning lines, radiation from the different transverse lineal segments of said terrain that are transverse to the direction of flight being projected respectively onto the two scanning lines at the same time, and radiation from successive lineal segments of the terrain being projected seriatim onto each of the scanning lines; and means for periodically and alternately sequentially detecting energy received by the respective photo-sensitive parts on each scanning line to produce two corresponding alternating series of electrical picture waves, the electrical picture wave corresponding to each transverse segment of the terrain having a duration that is a substantial portion of the repetition period of such periodic and alternate detection, the repetition period being small compared with the time elapsed between the projection of radiation from one segment of the terrain onto one scanning line and the projection of radiation from said one segment onto the other scanning line, whereby details of the terrain between segments thereof that are scanned successively on said two scanning lines are represented in each of said series of picture waves, whereby each series of picture waves bears intelligence respecting the distribution of radiation along successive transverse lineal segments of the terrain, the information contained in each series of picture waves corresponding respectively to a view of said terrain from a different direction along the flight course.

2. In a stereoscopic aerial survey system in which terrain is surveyed from an aircraft in flight along a flight course over said terrain: means defining an image area on said aircraft; two sets of photo-sensitive parts respectively arranged on two spaced-apart scanning lines in said image area for receiving radiation projected onto said image area; means for projecting onto said image area an aerial image of the terrain relative to which the aircraft is flying whereby the images of successive lineal segments of said terrain that lie transverse to the flight course progress along a reference axis extending in a predetermined direction in said image area and past said scanning lines, radiation from the different transverse lineal segments of said terrain that are transverse to the direction of flight being projected respectively onto the two scanning lines at the same time, and radiation from successive lineal segments of the terrain being projected seriatim onto each of the scanning lines; means for periodically and sequentially detecting energy received by the respective photo-sensitive parts on one scanning line in alternate halves of a scanning repetition period to produce one corresponding series of electrical picture waves; and means for periodically and sequentially detecting energy received by the respective photo-sensitive parts on the other scanning line in the other alternate halves of a scanning repetition period to produce a second corresponding series of electrical picture waves, each electrical picture wave having a duration that is slightly less than half of the repetition period of the periodic sequential detection of energy on each scanning line, each series of picture waves bearing intelligence respecting the distribution of radiation along successive transverse lineal segments of the terrain, the information contained in each series of picture waves corresponding respectively to a view of said terrain from a different direction along the flight course.

3. In an aerial survey system in which terrain is surveyed from an aircraft in flight along a flight course over said terrain: a camera tube having a light-sensitive screen mounted upon the aircraft, said screen having two sets of light-sensitive parts disposed on two corresponding scanning lines thereon; optical means for focusing directly upon said screen an image of the terrain relative to which said aircraft is flying, said image moving continuously across said scanning lines durng flight, images of two segments of said terrain that lie transverse to said flight course being formed simultaneously on said two scanning lines and images of successive segments of said terrain being formed seriatim on each of said scanning lines as said aircraft flies over said terrain; and means for repeatedly scanning said screen with an electron beam first along one of said scanning lines and then along the other scanning line to produce two alternating series of electrical picture waves, each series corresponding to scanning along a different scanning line, each electrical picture wave having a duration that is a substantial portion of the repetition period of such repeated scanning along any one scanning line, the repetition period being such compared with the time elapsed between the projection of radiation from one segment of the terrain onto one scanning line and the projection of radiation from said one segment onto the other scanning line that details of the terrain between segments thereof that are detected successively by scanning along said two scanning lines are represented in each of said series of picture waves, whereby each series of picture waves bears intelligence respecting the distribution of radiation along successive lineal segments of the terrain and information contained in each series corresponds respectively to a view of said terrain from a different direction along the flight course.

4. In an aerial survey system in which terrain is surveyed from an aircraft in flight along a flight course over said terrain: a camera tube having a light-sensitive screen mounted upon the aircraft, said screen having two sets of light-sensitive parts disposed on two corresponding scanning lines thereon; optical means for focusing directly upon said screen an image of the terrain relative to which said aircraft is flying, said image moving continuously across said scanning lines during flight, images of two segments of said terrain that lie transverse to said flight course being formed simultaneously on said two scanning lines and images of successive segments of said terrain being formed seriatim on each of said scanning lines as said aircraft flies over said terrain; means for projecting an electron beam onto said screen; a control pulse generator; means operated by said control pulse generator for causing said beam to scan said screen in the direction of said scanning lines; means also operated by said control pulse generator for deflecting said beam to the positions of said scanning lines alternately, whereby said screen is scanned along each of said scanning lines for a duration that is slightly less than one-half of the repetition period of such repeated scanning along either scanning line; and means controlled by the scanning of said scanning lines for producing two alternating series of picture waves, each series of picture waves bearing intelligence respecting the distribution of radiation along successive lineal segments of the terrain, the information contained in each series corresponding respectively to a view of said terrain from a different direction along the flight course.

5. In a stereoscopic aerial survey system in which terrain is surveyed from an aircraft in flight along a flight course over said terrain: means defining first and second scanning lines that lie transverse to the flight course and that are spaced apart along the flight course, said scanning lines moving along the flight course with said aircraft; means for periodically and alternately scanning energy emitted from different parts of the terrain along said first and second scanning lines, the energy scanned during the scanning along one scanning line being emitted in one direction relative to the flight course and the energy scanned during the scanning along the other scanning line being emitted therefrom in another direction, the duration of scanning along each scanning line being a substantial fraction of the period elapsed between commencement of successive scannings along the same scanning line, said period being small compared with the time elapsed between the passage of said two scanning lines past the same part of said terrain; means for sequentially detecting during the scanning along each scanning line radiant energy that is emitted by successive parts of the terrain that lie along the respective scanning lines at the time of scanning; and means for converting the radiant energy detected from successive parts of the terrain along the respective scanning lines into a composite wave composed of a pair of interlocked series of electrical picture waves that do not overlap, each series of picture waves bearing intelligence respecting the distribution of radiant energy along successive transverse lineal segments of the terrain, the information contained in each series of picture waves corresponding respectively to a view of said terrain from a different direction along the flight course.

6. In a stereoscopic aerial survey system in which terrain is surveyed from an aircraft in flight along a flight course over said terrain: means defining an image area on said aircraft; two sets of photo-sensitive parts repectively arranged on two spaced-apart scanning lines in said image area for receiving radiation projected onto said image area; optical means for forming in said image area an image of the terrain relative to which said aircraft is flying, said image moving continuously across said scanning lines during flight, images of two spaced-apart segments of said terrain that lie transverse to said flight course being formed simultaneously on said two scanning lines, and images of successive segments of said terrain being formed seriatim on each of said scanning lines as said aircraft flies over said terrain; a scanning wave generator for periodically generating scanning waves at a predetermined frequency; and means controlled by said scanning waves for alternately scanning the sets of light-sensitive parts on the respective scanning lines to produce two corresponding alternating series of electrical picture waves, the interval of scanning of each set of light-sensitive parts being a substantial fraction of the period of repetition of the scanning of each set of light-sensitive parts, the interval of scanning being small compared with the time elapsed between the passage of an image of a part of said terrain across one of said scanning lines and then across the other scanning line.

7. In an aerial survey system in which terrain is surveyed from an aircraft in flight along a flight course over said terrain: a camera tube having a light-sensitive screen mounted upon the aircraft, said screen having two sets of light-sensitive parts disposed on two corresponding scanning lines thereon; optical means for focusing upon said screen an image of the terrain relative to which said aircraft is flying, said image moving continuously across said scanning lines during flight, images of two spaced-apart segments of said terrain that lie transverse to said flight course being formed simultaneously on said two scanning lines, and images of successive segments of said terrain being formed seriatim on each of said scanning lines as said aircraft flies over said terrain; a scanning wave generator for periodically generating scanning waves at a predetermined frequency; and means employing said scanning waves for alternately scanning the two sets of light-sensitive parts on the respective scanning lines to produce two corresponding alternating series of electrical picture waves, the interval of scanning of each set of light-sensitive parts being a substantial fraction of the period of repetition of the scanning of each set of light-sensitive parts, the interval of scanning being small compared with the time elapsed between the passage of an image of a part of said terrain across one of said scanning lines and then across the other scanning line.

8. In an aerial survey system in which terrain is surveyed from an aircraft in flight along a flight course over said terrain: a camera tube having a light-sensitive screen mounted upon the aircraft, said screen having two sets of light-sensitive parts disposed on two corresponding scanning lines thereon; optical means for focusing directly upon said screen an image of the terrain relative to which said aircraft is flying, said image moving continuously across said scanning lines during flight, images of two segments of said terrain that lie transverse to said flight course being formed simultaneously on said two scanning lines, and images of successive segments of said terrain being formed seriatim on each of said scanning lines as said aircraft flies over said terrain; a scanning wave generator for periodically generating scanning waves at a predetermined frequency; and means controlled by said scanning waves for alternately scanning the sets of light-sensitive parts on the respective scanning lines at a low sub-multiple of said frequency to produce two corresponding alternating series of electrical picture waves, the interval of scanning of each set of light-sensitive parts being a substantial fraction of the period of repetition of the scanning of each set of light-sensitive parts.

9. In an aerial survey system in which terrain is surveyed from an aircraft in flight along a flight course over said terrain: a camera tube having a light-sensitive screen mounted upon the aircraft, said screen having two sets of light-sentive parts disposed on two corresponding scanning lines thereon; optical means for focusing directly upon said screen an image of the terrain relative to which said aircraft is flying, said image moving continuously across said scanning lines during flight, images of two segments of said terrain that lie transverse to said flight course being formed simultaneously on said two scanning lines, and images of successive segments of said terrain being formed seriatim on each of said scanning lines as said aircraft flies over said terrain; a scanning wave generator for periodically generating scanning waves at a predetermined frequency; and means controlled by said scanning waves for alternately scanning the sets of light-sensitive parts on the respective scanning lines to produce two corresponding alternating series of electrical picture waves, the interval of scanning of each set of light-sensitive parts being slightly less than one-half of the period of repetition of the scanning of each set of light-sensitive parts.

10. A system for surveying terrain as defined in claim 5, comprising: a source of radio frequency waves; means for modulating said radio frequency waves in accordance with said composite wave and for transmitting said modulated radio frequency waves to a remote point; means for receiving and demodulating said modulated radio frequency waves at such remote point whereby said composite wave is reproduced; means for segregating from said reproduced composite wave separate reproductions of said two series of electrical picture waves; a first recording means for converting one series of picture waves into one picture of said terrain as viewed from one of said directions; and a second recording means for converting the other series of picture waves into one picture of said terrain as viewed from the other of said directions.

11. A system for surveying terrain as defined in claim 5, comprising: a source of radio frequency waves; means for modulating said radio frequency waves in accordance with said composite wave and for transmitting said modulated radio frequency waves to a remote point; means for receiving and demodulating said modulated radio frequency waves at such remote point whereby said composite wave is reproduced; means for segregating from said reproduced composite wave separate reproductions of said two series of electrical picture waves; a pair of facsimile recorders, one of said facsimile recorders including a first recording element responsive to one of said series of picture waves, the other of said facsimile recorders including a second recording element responsive to other of said series of picture waves; and means for operating said recorders concurrently to drive strips of recording media past the respective recording elements whereby a pair of separate stereoscopic records of images of said terrain are produced on the respective strips.

12. In a stereoscopic aerial survey system in which terrain is surveyed from an aircraft in flight along a flight course over said terrain: means defining first and second scanning lines that lie transverse to the flight course and that are spaced apart along the flight course, said scanning lines moving along the flight course with said aircraft; a pulse generator for periodically generating control pulses at a predetermined frequency; means controlled by said control pulses for periodically and alternately sequentially detecting energy emitted from different parts of the terrain along said first and second scanning lines as said scanning lines move along the flight course with said aircraft, thereby repeatedly scanning the terrain along each said scanning line, the energy scanned during the scanning along one scanning line being emitted in one direction relative to the flight course and the energy scanned during the scanning along the other scanning line being emitted therefrom in another direction, the duration of scanning along each said scanning line being a substantial fraction of the period at which said control pulses are generated, said period being small compared with the time elapsed between the passage of said two scanning lines past the same part of said terrain; means for converting the energy detected from successive parts of the terrain along the respective scanning lines into a composite wave composed of a pair of interlocked series of electrical picture waves that do not overlap, each series of picture waves bearing intelligence respecting the distribution of energy along successive transverse lineal segments of the terrain, the information contained in each series of picture waves corresponding respectively to a view of said terrain from a different direction along the flight course; a source of radio frequency waves; means for modulating said radio frequency waves in accordance with said composite wave and for transmitting said modulated radio frequency waves to a remote point; means for receiving and demodulating said modulated radio frequency waves at such remote point whereby said composite wave is reproduced; means for segregating from said reproduced composite wave separate reproductions of said two series of electrical picture waves; means controlled by one reproduced series of picture waves for producing an integrated image of said terrain as viewed in one of said directions; and means controlled by the other reproduced series of picture waves for producing an integrated image of said terrain as viewed in the other of said directions.

13. In a stereoscopic aerial survey system in which terrain is surveyed from an aircraft in flight along a flight course over said terrain: means defining first and second scanning lines that lie transverse to the flight course and that are spaced apart along the flight course, said scanning lines moving along the flight course with said aircraft; a primary pulse generator for periodically generating control pulses at a predetermined frequency; a secondary pulse generator controlled by said primary pulse generator for generating registration pulses at a frequency that is one-half of said predetermined frequency; means controlled by said pulse generators for periodically and alternately sequentially detecting energy emitted from different parts of the terrain along said first and second scanning lines as said scanning lines move along the flight course with said aircraft, thereby repeatedly scanning the terrain along each said scanning line, the energy scanned during the scanning along one scanning line being emitted in one direction relative to the flight course and the energy scanned during the scanning along the other scanning line being emitted therefrom in another direction, the duration of scanning along each said scanning line being a substantial fraction of the period at which said control pulses are generated, said period being small compared with the time elapsed between the passage of said two scanning lines past the same part of said terrain; means for converting the energy deected from successive parts of the terrain along the respective scanning lines into a composite wave composed of a pair of interlocked series of electrical picture waves that do not overlap, each series of picture waves bearing intelligence respecting the distribution of energy along successive transverse lineal segments of the terrain, the information contained in each series of picture waves corresponding respectively to a view of said terrain from a different direction along the flight course; a source of radio frequency waves; means for modulating said radio frequency waves in accordance with said composite wave and for transmitting said modulated radio frequency waves to a remote point; means for receiving and demodulating said modulated radio frequency waves at such remote point whereby said picture waves, said control pulses, and said registration pulses are reproduced; means controlled by said reproduced registration pulses for segregating from said reproduced composite wave separate reproductions of said two series of electrical picture waves; means controlled by said reproduced control pulses and one reproduced series of picture waves for producing an integrated image of said terrain as viewed in one of said directions; and means controlled by said reproduced control pulses and the other reproduced series of picture waves for producing an integrated image of said terrain as viewed in the other of said directions.

14. In a method of stereoscopic aerial surveying of terrain from an aircraft in flight across a predetermined flight course of said terrain, the steps of: successively projecting onto one scanning line on the aircraft images of a plurality of successive segments of the terrain that lie transverse to said flight course, such images being formed by energy received on said aircraft from one direction along said flight course; successively projecting onto a second scanning line on said aircraft images of said plurality of successive segments of the terrain, the latter images being formed by energy received on said aircraft from a second direction along said flight course; alternately scanning images projected onto said two scanning lines to detect variations in the intensity of radiant energy received from different parts of the terrain segments; converting each scanned image into a corresponding electrical picture wave; and scanning such images along each scanning line at a repetition period that is small compared with the time elapsed between the projection of an image of the same segment of the terrain onto one of said scanning lines and then onto the other and over a time interval that is a substantial portion of the time elapsed between successive scannings of images along each scanning line, thereby forming two series of electrical picture waves of said terrain, each series of picture waves bearing intelligence respecting the distribution of radiant energy along successive transverse segments of the terrain, the information contained in one series of picture waves corresponding to a view of said terrain in one of said directions, and the information contained in the other series of picture waves corresponding to a view of said terrain in the other of said directions.

15. In a method of stereoscopic aerial surveying of terrain from an aircraft in flight across a predetermined flight course of said terrain, the steps of: successively projecting onto one scanning line on the aircraft images of a plurality of successive segments of the terrain that lie transverse to said flight course, such images being formed by energy received on said aircraft from one direction along said flight course; successively projecting onto a second scanning line on said aircraft images of said plurality of successive segments of the terrain, the latter images being formed by energy received on said aircraft from a second direction along said flight course; alternately scanning images projected onto said two scanning lines to detect variations in the intensity of radiant energy received from different parts of the terrain segments; converting each scanned image into a corresponding electrical picture wave; and performing each scanning step over a time interval that is slightly less than one-half the time elapsed between successive scannings along each scanning line, thereby forming two series of electrical picture waves of said terrain, each series of picture waves bearing intelligence respecting the distribution of radiant energy along successive transverse segments of the terrain, the information contained in one series of picture waves corresponding to a view of said terrian in one of said directions, and the information contained in the other series of picture waves corresponding to a view of said terrain in the other of said directions.

16. In a method of stereoscopic aerial surveying of terrian from an aircraft in flight across a predetermined flight course of said terrain, the steps of: receiving radiant energy at said aircraft during flight from different transversely spaced parts of a succession of segments of the terrain that lies transverse to said flight course, said radiant energy being received from said segments after travel to said aircraft in one direction along said flight course; receiving radiant energy at said aircraft during flight from different transversely spaced parts of said succession of segments of the terrain that lies transverse to said flight course, said radiant energy being received from said segments after travel to said aircraft in another direction along said flight course; scanning each segment by sequentially detecting received radiant energy that is emitted by different transversely spaced parts of the terrain in each said segment thereof; converting the radiant energy detected in the scanning of each segment of the terrain into a corresponding electrical picture wave; alternately repeating the scanning steps with respect to the two directions of energy reception; and performing each scanning step at a repetition period that is small compared with the time elapsed between the time that radiant energy from one part of the terrain is received at the aircraft after travel thereto in one direction and the time that radiant energy from the same part of the terrain is received at the aircraft after travel thereto in the other direction, and over a time interval that is a substantial portion of the time elapsed between successive scannings with respect to each of said directions, thereby forming two series of electrical picture waves, each series of picture waves bearing intelligence respecting the distribution of radiant energy along successive transverse segments of the terrain, the information contained in one series of picture waves corresponding to a view of said terrain in one of said directions, and the information contained in the other series of picture waves corresponding to a view of said terrain in the other of said directions.

References Cited in the file of this patent

UNITED STATES PATENTS

| | | |
|---|---|---|
| 2,107,464 | Zworykin | Feb. 8, 1938 |
| 2,215,946 | Radinger | Sept. 24, 1940 |
| 2,267,120 | Mathes | Dec. 23, 1941 |
| 2,288,871 | Adams | July 7, 1942 |
| 2,300,568 | Hansell | Nov. 3, 1942 |
| 2,301,254 | Carnahan | Nov. 10, 1942 |
| 2,373,114 | Goldsmith | Apr. 10, 1945 |
| 2,388,170 | McCollum | Oct. 30, 1945 |
| 2,417,446 | Reynolds | Mar. 18, 1947 |
| 2,423,885 | Hammond | July 15, 1947 |
| 2,449,542 | Ayres | Sept. 21, 1948 |
| 2,480,868 | Marshall | Sept. 6, 1949 |
| 2,696,523 | Theile | Dec. 7, 1954 |
| 2,709,716 | Haller | May 31, 1955 |

FOREIGN PATENTS

| | | |
|---|---|---|
| 700,982 | Great Britain | Dec. 16, 1953 |